United States Patent [19]

Hoffmann, Sr.

[11] Patent Number: 5,298,099
[45] Date of Patent: Mar. 29, 1994

[54] CONTOURABLE SURFACE REPAIR COMPOUND REINFORCEMENT AND POSITIONING MATRIX

[75] Inventor: Dennis Hoffmann, Sr., Palatine, Ill.

[73] Assignee: Pro Patch Systems, Inc., Palatine, Ill.

[21] Appl. No.: 32,745

[22] Filed: Mar. 17, 1993

Related U.S. Application Data

[63] Continuation of Ser. No. 744,258, Aug. 13, 1991, abandoned, which is a continuation of Ser. No. 404,491, Sep. 8, 1989, abandoned.

[51] Int. Cl.⁵ ............................................ B32B 35/00
[52] U.S. Cl. ........................................ 156/94; 428/63; 428/247; 428/256
[58] Field of Search ............... 428/63, 247, 256; 156/94, 97

[56] References Cited

U.S. PATENT DOCUMENTS

| | | | |
|---|---|---|---|
| 2,099,047 | 11/1937 | Bradshaw | 428/426 |
| 3,311,696 | 3/1967 | Melnick | 174/18 |
| 3,855,044 | 12/1974 | Riel | 428/256 |
| 4,135,017 | 1/1979 | Hoffman, Sr. | 428/63 X |
| 4,259,385 | 3/1981 | Keller | 428/135 |
| 4,707,391 | 11/1987 | Hoffman, Sr. | 428/63 |
| 4,732,633 | 3/1988 | Pokorny | 428/63 X |
| 5,075,149 | 12/1991 | Owens et al. | 428/63 X |

Primary Examiner—Daniel Zirker
Attorney, Agent, or Firm—David I. Roche

[57] ABSTRACT

The present invention is directed to a contourable surface repair compound matrix. Such a matrix is directed to apparatus for reinforcement and positioning of the repair compound and comprises a mesh-like structure including a plurality of deformable contour modules, preferably in the form of diamond-shaped elements, to form a sheet-like structure which is readily adaptable to be formed in a variety of stable formats. Such contourable surface repair compound matrix is configured as a sheet having at least one substantially planar surface which is adapted to receive an adhesive thereon, and further includes adhesive disposed onto such side of the sheet for securing the sheet to the surface to be repaired, in order to form a firm anchor for the support of the repair compound to be applied thereto.

2 Claims, 1 Drawing Sheet

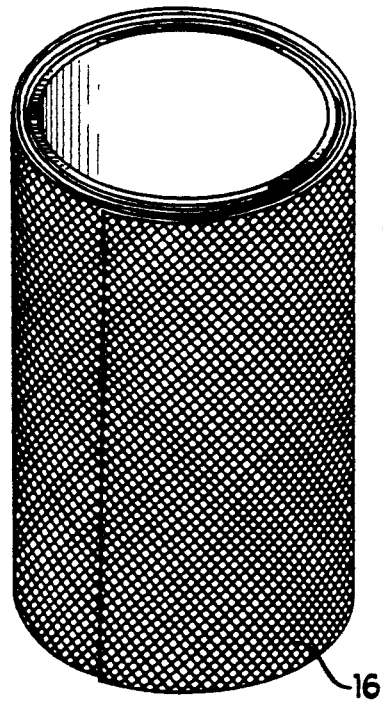
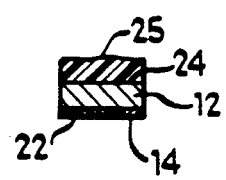
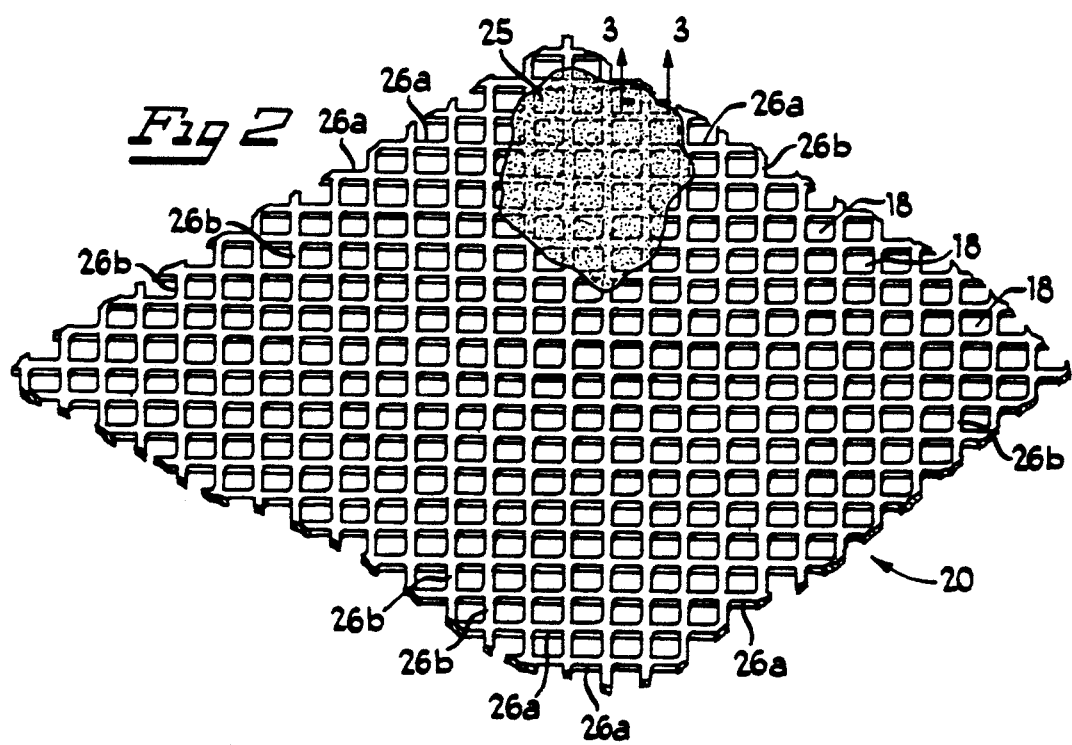

1

CONTOURABLE SURFACE REPAIR COMPOUND REINFORCEMENT AND POSITIONING MATRIX

This application is a continuation of application Ser. No. 07/744,258, filed Aug. 13, 1991, now abandoned, which was a continuation of application Ser. No. 07/404,491, filed Sep. 8, 1989, now abandoned.

BACKGROUND OF THE INVENTION

The present invention relates in general to repair materials and more particularly to a contourable surface repair compound reinforcement and positioning matrix.

In the prior art, certain repairs to drywall, wood, metal, plastic, PVC pipe, and/or various metal objects have been rendered difficult or expensive because of the general inability to reinforce and position repair materials, including plaster, polymeric materials, or metal containing compounds, usually of a curable, thermosetting or other bonding nature, to the object for repair. Also, such repairs have been rendered less than permanent by the inability to provide a stable reinforcement and positioning matrix for such compatible repair compounds.

Yet additionally, certain repairs to three-dimensional contoured structures have been rendered difficult because of the further inability to form a correctly contoured matching surface for holding, positioning and reinforcing the repair materials. Yet further additionally, the use of certain other repair material holding means has rendered sanding or otherwise forming a suitable finish surface to be difficult to obtain.

In view of the above difficulties with and deficiencies of prior art materials, it is a material object of the present invention to provide a contourable surface repair compound reinforcement and positioning matrix which will materially alleviate the difficulties associated with such prior art devices.

SUMMARY OF THE INVENTION

The present invention is directed to a contourable surface repair compound matrix. Such a matrix is directed to apparatus for reinforcement and positioning of the repair compound and comprises a mesh-like structure including a plurality of deformable contour module means, preferably in the form of diamond-shaped elements. Such elements are preferable in the form of parallelogrammic linkagess.

The contourable surface repair compound matrix of the present invention is preferably formed as a sheet having at least one substantially planar surface, which surface is adapted to receive an adhesive thereon. Such matrix has adhesive disposed onto such side of the sheet for securing the sheet to the surface to be repaired, in order to form a firm anchor for the support of the repair compound to be applied thereto.

Other aspects of the improved contourable surface repair compound matrix of the present invention will become apparent upon review of the accompanying drawing and detailed description of the present invention, as set forth hereinbelow.

BRIEF DESCRIPTION OF THE DRAWING

The contourable surface repair compound matrix of the present invention is set forth in the accompanying drawing, and in which:

FIG. 1 is a perspective view of the contourable surface repair compound matrix of the present invention, as disposed in its rolled format;

FIG. 2 is a greatly enlarged plan view of the contourable surface repair compound matrix showing the deformable contour modules thereof disposed in interconnected mesh-like array to define a sheet;

FIG. 3 is a further greatly enlarged cross-sectional view taken along lines 3—3 of FIG. 2, further showing the substantially planar structure of the sheet forming the contourable surface repair compound matrix of the present invention, and yet further showing thereon adhesive disposed on one side thereof for securing the deformable mesh-like sheet to the object to be repaired.

Further aspects of the improved contour surface repairable compound reinforcement and positioning matrix of the present invention will become more apparent to those of ordinary skill in the art upon a review of the following detailed description of preferred embodiments, appended claims and attached drawing.

DETAILED DESCRIPTION OF PREFERRED EMBODIMENTS

The contour surface repair compound matrix of the present invention comprises fundamentally two elements—i.e., (a) a mesh-like sheet having certain parallelogrammic elements as described and claimed herein, and (b) which supports on one surface thereof an adhesive for attachment to the object to be repaired.

More particularly, the contourable surface repair compound matrix of the present invention is directed to a plurality of metallic, omni-dimensionally deformable contour modules which are disposed in interconnected mesh-like array. Such deformable contour modules define a sheet to be formed into a selected shape for supporting, positioning and reinforcing a surface repair compound. The mesh-like sheet structure of the contourable surface repair compound matrix of the present invention has at least one side thereof adapted to receive an adhesive. Such adhesive is applied to such one side of the sheet for securing the sheet to the surface to be repaired.

In preferred embodiments of the contourable surface repair compound matrix of the present invention, at least one side of the sheet may be substantially planar to facilitate receiving the adhesive thereon. Preferably, both sides of the sheet are rendered essentially planar, such as by rolling the mesh through a flattening roller in order to form a substantially flat, or planar, surface also on the opposite side of the sheet for receiving the repair compound thereon.

The mesh-like sheet of the present invention is preferably formed from aluminum, and in preferred embodiments comprises a plurality of interconnected parallelogrammic linkages. Such deformable contour modules may preferably comprise a plurality of interconnected substantially diamond-shaped mesh-like elements. Such sheets of deformable contour modules preferably have a transverse thickness of approximately 0.010 inches.

In regard to the plane of the sheet of the contourable surface repair matrix, upon contouring thereof a portion of the deformable contour modules may be compressed and a second portion thereof may be stretched in order to formulate the selected shape for effectuating the repair to the object to be repaired. Such mesh-like sheet structure of the contourable surface repair compound matrix of the present invention may further in preferred embodiments be bendable from an essentially planar shape into a selected non-planar shape. By these structures, the matrix of the present invention may be formed into virtually any shape.

Potential uses of the contourable surface repair compound matrix of the present invention in the automotive area include repairing holes, dents, rust damage to areas in the automobile body, such as particularly in regard to rusted out door bottoms and wheel wells, and regarding marine applications include repairing fiberglass, wood and plastic boats and other marine structures, and further including cracks and holes. The formulation of the mesh-like sheet of the contourable surface repair compound matrix of the present invention from rustproof aluminum facilitates its utilization in the marine environment. Although copper or other readily deformable metals may likewise be suitable for this and other applications. Trucks and cab bodies, as well as trailers, may be repaired with the strong, lightweight repair mesh of the present invention. In regard to aviation uses, the contourable surface repair compound matrix of the present invention may be utilized to repair cracks and holes.

Such repair mesh hereof may be fanned for irregularly shaped areas, and may further be used as backing for custom designing and for hobby crafts. On the whole, the contourable surface repair compound matrix of the present invention may be utilized to repair holes and cracks in drywall, plaster siding and wood, as the mesh-like sheet structure may be bent to form any sort of corner, whether an inside corner or an outside corner. In industrial usages, the contourable surface repair compound matrix of the present invention may be utilized to repair office and warehouse walls and ceilings, as well as holes in plastic drain pipes.

In regard to agricultural and farm usages, the contourable surface repair compound matrix of the present invention may be utilized to repair metal and wood roofs, also bins and troughs, as well as to reshape rotten wooden areas. In regard to recreational vehicle usages, the contourable surface repair compound matrix of the present invention may be utilized to repair motor homes and travel trailers, including fiberglass, aluminum or plastic exteriors, with shapes whether regular or irregular.

The contourable surface repair compound matrix of the present invention is best utilized by first cleaning the area around the damaged surface to be repaired. Metal surfaces should preferably be sanded before applying the mesh-like sheet structure thereto. The mesh-like sheet structure of the present invention is applied over the damaged area by firmly compressing the adhesive surface against the area to be repaired, and completely covering any hole, cracks, or damaged areas. Large holes may require two layers of the mesh-like sheet material of the present invention. All edges should be firmly pressed against the surface to be repaired. Next, a thin coat of a body filler, joint compound or other compatible repair compound should be applied over the mesh-like sheet structure, over surrounding areas and onto overlapping surrounding areas. Thereafter, the repair compound is permitted to dry and/or cure. The manufacturer's instructions in regard to mixing and finishing the particular compound of choice should be followed. The thin coat of body or other filler thus applied should then be sanded to the desired finish.

Depending on the surface and the extent of the damage thereto, additional thin coats of the contourable surface repair compound matrix of the present invention may be required. If additional coats are applied, the prior coat should be sanded before application of an additional coat, whereupon the repaired surface is rendered ready for painting or other finishing. In most usages, the only materials required to be utilized in connection with the contourable surface repair compound matrix of the present invention are a knife or scissors, body filler or other patching compound, and sandpaper. As such, the contourable surface repair compound matrix is suitable for use by homeowners and other nonprofessional finishers.

The mesh aluminum metal sheet element of the present invention may be obtained from the Belker Corp. of Bradford, Conn. with the request that such mesh-like structure be flattened by rolling, as indicated both for ease and effectiveness in applying an adhesive and also for providing a more efficient surface for holding the repair compound. Although the contourable surface repair compound matrix of the present invention is not confined to an aluminum mesh sheet, and other metals such as copper may be used, aluminum metal does provide the maximum workability, bendability, lightness and strength. The width and length of the contourable surface repair compound may be of any desired size. One adhesive utilized with particularly efficient results in National Brand pressure sensitive number 33-4034, although other adhesives may likewise prove to be generally functional.

Referring now to the drawing and to FIG. 3 in particular, the contourable surface repair compound matrix generally 10 of the present invention comprises a mesh-like sheet 12, which supports on one surface thereof an adhesive 14 for attachment to the object to be repaired. Such contourable surface repair compound matrix 10 may be disposed into a rolled format 16 for convenience of storage, shipment and sale, as shown in FIG. 1.

More particularly, and as shown in FIG. 2 the contourable surface repair compound matrix of the present invention is directed to a plurality of omnidimensionally deformable 10 contour modules 18 which are disposed in interconnected mesh-like array. Such deformable contour modules 18 define a sheet generally 20 as shown in FIG. 2, to be formed into a selected shape for supporting, positioning and reinforcing a surface repair compound. As shown in FIG. 3, the mesh-like sheet structure of the contourable surface repair compound matrix 10 of the present invention has at least one side 22 thereof adapted to receive adhesive 14. Such adhesive 14 is applied to such one side 22 of sheet 20 for securing sheet 20 to the surface to be repaired.

As shown also in FIG. 3, in preferred embodiments of the contourable surface repair compound matrix 10 of the present invention, at least such one side 22 of the sheet may be substantially planar to facilitate receiving adhesive 14 thereon. Preferably, both sides 23, 24 of sheet 20 are rendered essentially planar, such as by rolling the mesh through a flattening roller in order to form a substantially flat, or planar, surface also on opposite side 24 of sheet 20 for receiving the repair compound thereon.

As indicated, the mesh-like sheet 20 of the present invention is preferably formed from aluminum, and in preferred embodiments comprises a plurality of interconnected paralleogrammic linkages comprising essentially parallel linkage elements 26a, 26b. Such deformable contour modules may preferably comprise a plurality of interconnected substantially diamond-shaped mesh elements. As shown in FIG. 3, such sheet 20 of deformable contour modules 18 preferably has a transverse thickness of approximately 0.010 inches.

Of course, the plane of sheet 20 of the contourable surface repair matrix 10 may be bent, twisted or otherwise distorted. Also, upon contouring thereof, a portion of the deformable contour modules 18 may be compressed and a second portion thereof may be stretched in order to formulate the selected shape for effectuating the repair to the object to be repaired. Thus, such meshlike sheet structure 20 of the contourable surface repair compound matrix 10 of the present invention is bendable from an essentially planar shape, as shown in FIG. 2, into virtually any selected non-planar or other shape.

The basic and novel characteristics of the improved methods and apparatus of the present invention will be readily understood from the foregoing disclosure by those skilled in the art. It will become readily apparent that various changes and modifications may be made in the form, construction and arrangement of the improved apparatus of the present invention, and in the steps of the inventive methods hereof, which various respective inventions are as set forth hereinabove without departing from the spirit and scope of such inventions. Accordingly, the preferred and alternative embodiments of the present invention set forth hereinabove are not intended to limit such spirit and scope in any way.

What is claimed is:

1. A method of using a deformable and contourable metallic mesh together with a curable repair compound to repair a hole in a surface, the method comprising the steps of forming a first sheet of metallic mesh, the mesh being comprised of linkages arranged to form a series of similar parallelogramic openings which are omnidimensionally deformable in order to allow the mesh to accommodate non-planar surfaces and partially non-planar surfaces, the mesh further having a pressure sensitive adhesive applied to a first side thereof to a size greater than the size of the hole, using the pressure sensitive adhesive on the first side to firmly anchor the first sheet to areas of the surface adjacent to the hole and contouring the first sheet to the shape of the surface, placing a curable repair compound over the first sheet so as to cover the first sheet and the hole, contouring the repair compound to the shape of the surface, allowing the repair compound to cure, and sanding the outer surface portions of the repair compound after it is cured to obtain a desired surface finish.

2. The method of claim 1 further comprising the step of forming a second sheet of metallic mesh having pressure sensitive adhesive applied to a first side thereof, using the pressure sensitive adhesive carried by the second sheet to firmly anchor the second sheet to form a double layer of the mesh prior to application of the repair compound.

* * * * *